United States Patent [19]

Agari et al.

[11] 4,171,889

[45] Oct. 23, 1979

[54] LIGHT METERING SYSTEM IN A CAMERA

[75] Inventors: Yujiro Agari, Tokyo; Akira Tajima, Kawasaki, both of Japan

[73] Assignee: Canon Kabushiki Kaisha, Tokyo, Japan

[21] Appl. No.: 879,617

[22] Filed: Feb. 21, 1978

Related U.S. Application Data

[63] Continuation of Ser. No. 802,548, Jun. 1, 1977, abandoned, which is a continuation of Ser. No. 657,316, Feb. 11, 1976, abandoned.

[30] Foreign Application Priority Data

Feb. 21, 1975 [JP] Japan ................................ 50-21572

[51] Int. Cl.$^2$ .............................................. G03B 7/08
[52] U.S. Cl. ................................................... 354/56
[58] Field of Search ................... 354/56, 59, 155, 201, 354/224, 225

[56] References Cited

FOREIGN PATENT DOCUMENTS

| 1377796 | 9/1964 | France | 354/59 |
| 43-28379 | 11/1968 | Japan | 354/155 |
| 1052168 | 12/1966 | United Kingdom | 354/155 |

*Primary Examiner*—Michael L. Gellner
*Attorney, Agent, or Firm*—Toren, McGeady and Stanger

[57] ABSTRACT

A light meter arrangement for a camera having a zoom objective and a view finder. A beam splitter is arranged between the zoom control lens assembly and the relay lens to split off a fraction of the beam of light coming from the assembly and to direct the fraction of afocal form to the view finder. In order to deflect an integral marginal portion of the view finder light beam to a light-sensitive element, there is provided a single prismatic entity having an entrance face positioned adjacent the exit face of the beam splitter. This entity is constructed to have a number of total reflection surfaces arranged to function as a condenser for the light rays passing therethrough.

4 Claims, 2 Drawing Figures

LIGHT METERING SYSTEM IN A CAMERA

This is a continuation of application Ser. No. 802,548, filed June 1, 1977, which in turn is a continuation of application Ser. No. 657,316, filed Feb. 11, 1976 both abandoned.

This invention relates to reflex cameras, and more particularly to a light meter arrangement for a reflex camera, especially a camera having a beam splitter arranged to take a view finder light beam of afocal form out of the path of the main beam of light going to the focal plane of the camera.

It is known to provide means for deflecting a marginal portion of the view finder light beam at an afocal region thereof to a light sensitive element located outside the path of the view finder light beam, as disclosed, for example, in Japanese Utility Model Publication No. 43-28379, in which a mirror having a central portion bored therethrough in arranged in the path of the view finder light beam at an afocal region thereof and is inclined with respect to the optical axis of the view finder, so that the marginal portion of the light beam is reflected by the mirror to the light sensitive element. As the light sensitive element has a smaller light-receiving area than the mirror, however, a provision is required for converging rays of light reflected from the mirror to a relatively small area of the light sensitive element. In addition to this, the light-metering system of the mirror type referred to is disadvantageous in that it is difficult to assemble its various components within acceptable tolerances economically. Therefore, these requirements can not be satisfied adequately in known cameras with built-in exposure meters of the through-the-lens-metering type.

Accordingly, an object of the present invention is to provide a light meter arrangement for a reflex camera in which the deflection and convergence of light rays from an integral marginal portion of a view finder light beam taken at a substantially afocal region thereof onto a relatively small area of a light sensitive element are effected by use of a single physical or prismatic entity.

Another object of the invention is to provide a reflex camera with a built-in exposure meter of the through-the-lens-metering type in which the means of picking up an integral marginal portion of a view finder light beam to perform the light level measurement is simple in arrangement and construction, and easy to manufacture.

Other objects and advantages of the present invention will become apparent from the following description taken in conjunction with the accompanying drawings in which.

Figure 1:
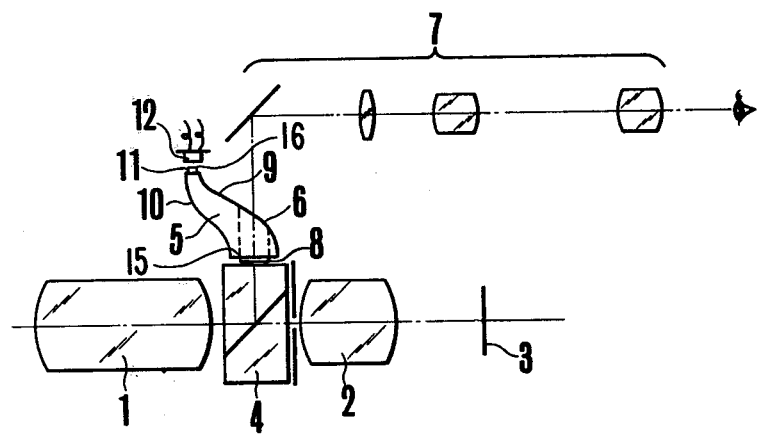
FIG. 1 is a schematic sectional view of the basic components of a reflex camera with a built-in exposure meter employing a single physical entity in one form of the present invention.

Referring to FIG. 1, there is shown a reflex camera having a zoom objective with a zoom control lens 1 and a relay lens 2 by which an image of an object being photographed is focused at a plane 3. A beam of light rays exiting from the zoom control lens 1 is substantially afocal to permit location of a beam splitter 4 therein by which a fraction of the light beam exiting from the zoom control lens is split off to a view finder 7 of the camera, while the view finder image is not substantially affected by variation of the focal length of the zoom objective. According to one embodiment of the present invention, a light meter arrangement comprises a light sensitive element 12 having a relatively small light receiving area such as a silicon photo cell, and a single physical entity of a modified circular conic form arranged between the photo cell 12 and the beam splitter 4. The modified circular conic entity 5 is provided with a hole 6 bored therethrough from a central portion of the entrance bottom surface area thereof in a vertical direction as viewed in the figure to permit a central portion of the light beam coming from the beam spitter 4 to pass therethrough to the view finder 7. The annular entrance surface 8 of the entity 5 is so dimensioned that an integral marginal portion of the light beam coming from the beam splitter 4 and going to the view finder 7 is picked up and deflected by total reflection from the conic wall sections 9 and 10 to the photo cell 12 located outside the path of the view finder light beam, while being converged thereto, as the light receiving surface of the photo cell faces the exit surface 11 of the entity 5. The entity 5 of modified circular conic form according to the invention may be made either of glass or of plastic such as scrylic resin.

Figure 2:
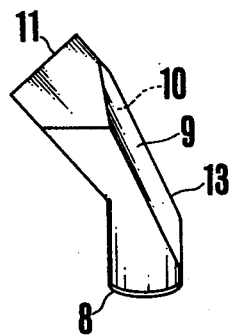
FIG. 2 is a perspective view of a prismatic entity in another form of the present invention.

In FIG. 2, there is shown another form of the entity of FIG. 1 as having flat wall sections corresponding to those 9 and 10 of FIG. 1 and intersecting with each other along a line 13. These wall sections 9 and 10 are inclined with respect to the entrance surface 8 and to each other to effect a convergence of the light rays from the entrance surface 8 to exit surface 11. In some cases where the degree of covergence of the light rays is required to furthermore increase, either or both of the entrance and exit surfaces 8 and 11 may be configured to function as a collector lens or lenses.

A collector lens 15 appears at the entrance surface 8 and a collector lens 16 at the exit surface 11.

Since many modifications may be made in the abovedescribed embodiment of the invention without departing from the spirit of the invention, it is to be understood that the invention should be limited only by the scope of the claims appended below.

What is claimed is:

1. A light meter arrangement for a camera having a zoom objective and a beam splitter, said zoom objective being composed of a zoom control lens and a relay lens, and said beam splitter being arranged between said zoom control lens and said relay lens to split off a fraction of a beam of light coming from said zoom control lens and going to said relay lens and to direct said fraction to a view finder of said camera, said light meter arrangement comprising in combination:
   (a) a light-sensitive element located outside the path of said light beam fraction; and
   (b) a single optical transparent black member having an entrance surface positioned in the path of said light beam fraction going to said view finder at a substantially afocal region thereof and configured to pick up a marginal portion of said light beam fraction, having an exit surface facing the light-receiving surface of said light-sensitive element, and having a side wall inclined with respect to said entrance surface to direct the light rays entering at said entrance surface after reflection therefrom to said exit surface.

2. A light meter arrangement according to claim 1, wherein said side wall is provided with a plurality of flat reflective surfaces formed therein and arranged around a common axis to effect a convergence of said picked-up light rays to said light sensitive element.

3. A light meter arrangement according to claim 1, wherein said entrance surface is provided with a collector lens formed therein.

4. A light meter arrangement according to claim 1, wherein said exit surface is provided with a collector lens formed therein.

* * * * *